United States Patent [19]

Wincklhofer et al.

[11] Patent Number: 5,246,988
[45] Date of Patent: Sep. 21, 1993

[54] STABILIZED POLYMERIC ARTICLE AND METHOD OF PRODUCING

[75] Inventors: Robert C. Wincklhofer; Gene C. Weedon, both of Richmond; Robert M. Marshall, Chesterfield; Kimon C. Dardoufas, Richmond, all of Va.

[73] Assignee: AlliedSignal Inc., Morristown, N.J.

[21] Appl. No.: 803,653

[22] Filed: Nov. 25, 1991

Related U.S. Application Data

[63] Continuation of Ser. No. 484,287, Feb. 26, 1990, abandoned.

[51] Int. Cl.$^5$ ............................ C08K 5/34; C08K 5/10
[52] U.S. Cl. ........................................ 524/86; 524/90; 524/100; 524/102; 524/315
[58] Field of Search ............... 524/86, 90, 100, 102, 524/315

[56] References Cited

U.S. PATENT DOCUMENTS

| | | |
|---|---|---|
| 3,860,676 | 1/1975 | Krackeler et al. ............... 524/101 |
| 3,887,516 | 6/1975 | Song ............................ 524/100 |
| 4,028,333 | 6/1977 | Lindvay ....................... 524/100 |
| 4,056,507 | 11/1977 | Schäpel ....................... 524/308 |
| 4,089,912 | 5/1978 | Levek et al. .................. 524/94 |
| 4,404,296 | 9/1983 | Ramey et al. ................. 524/102 |
| 4,413,110 | 11/1983 | Kavesh et al. ................. 524/108 |
| 4,457,985 | 7/1984 | Harpell et al. ................ 428/224 |
| 4,818,799 | 4/1989 | Chatterjee et al. ............. 524/174 |
| 4,904,712 | 2/1990 | Seltzer et al. ................. 524/91 |

Primary Examiner—Kriellion S. Morgan

[57] ABSTRACT

A heat and oxidation stabilized polymeric article, preferably fiber or film, is prepared by applying to the article a composition which comprises effective amounts of a nitrogen-containing antioxidant and a compatible carrier. When the composition is applied as a process finish, the carrier is a lubricant which is the reaction product of an alkylene oxide with a compound selected from the group consisting of a fatty acid having about 5 to 36 carbon atoms and an alcohol having about 5 to 36 carbon atoms, with the number of moles of alkylene oxide per mole of acid or alcohol ranging from 2 to 20. The stabilized article has utility in high performance applications.

20 Claims, No Drawings

STABILIZED POLYMERIC ARTICLE AND METHOD OF PRODUCING

This application is a continuation of application Ser. No. 484,287 filed Feb. 26, 1990 now abandoned.

BACKGROUND OF THE INVENTION

1. Field of the Invention

The present invention relates to a stabilized polymeric article and a method of producing the same. More particularly this invention relates to a fiber or film, made from a high molecular weight polyolefin, a high molecular weight polyvinyl alcohol, a high molecular weight polyacrylonitrile, copolymers or mixtures thereof, for high performance applications wherein the fiber or film is stabilized against thermal and oxidative degradation as evidenced by a substantial retention of breaking strength.

2. Prior Art

Thermal degradation of fiber from exposure to elevated temperatures and oxidative degradation of fiber from aging are well known problems in the fiber industry. In the case of condensation type polymer fibers such as polyester and polyamide, stabilizers are typically incorporated with the fiber forming polymer melt or solution prior to spinning or added to the surface of the fiber in a spin finish composition. In the case of addition type polymer fibers, such as gel spun polyethylene and polypropylene which are subsequently subjected to solvent extraction (see U.S. Pat. Nos. 4,413,110 and 4,771,616, both of which are hereby incorporated by reference), it has been discovered that stabilizers incorporated with the polymer solution or added in a finish composition prior to solvent extraction are extracted along with the solvent. Therefore, a system is needed which can take a heat and oxidative stabilizer into the fiber or a film and survive the fiber or film forming processes. Applicants have discovered such a system.

BRIEF DESCRIPTION OF THE INVENTION

The present invention is a method of producing a stabilized article, preferably fiber or film, made from a polymer selected from the group consisting of a high molecular weight polyolefin, a high molecular weight polyvinyl alcohol, a high molecular weight polyacrylonitrile, and copolymers and mixtures thereof, comprising treating the article with an effective amount of a composition comprising a nitrogen-containing antioxidant and a compatible carrier.

A compatible carrier is one capable of forming a homogeneous mixture with the antioxidant for uniform application to the article. The preferred carrier is a lubricant which is the reaction product of an alkylene oxide with a compound selected from the group consisting of a fatty acid having about 5 to 36 carbon atoms and an alcohol having about 5 to 36 carbon atoms. The number of moles of alkylene oxide per mole of said compound ranges from about 2 to 20.

The present invention also includes the heat and oxidation stabilized article, preferably fiber or film, produced by the method.

By fiber is meant an elongate body, the length dimension of which is much greater than the transverse dimensions of width and thickness. Accordingly, the term fiber includes monofilament, multifilament, ribbon, strip, staple and other forms of chopped or cut fiber and the like having regular or irregular cross-sections. Fiber and filament are used interchangeably herein.

By film is meant a thin sheet.

Fiber and film stabilized in accordance with the present invention can be used wherever resistance to degradation from heat or aging is required, e.g., in composites which are cured at elevated temperatures for extended lengths of time. These composites would have utility in structural, high impact and ballistic end uses.

DESCRIPTION OF THE PREFERRED EMBODIMENT

A mixture of a nitrogen-containing antioxidant in a carrier, when applied to fiber or film, enhances the heat and oxidative stability of the fiber or film, as evidenced by the improved breaking strength retention.

Illustrative of useful polymers are the extended chain polymers formed by polymerization of $\alpha,\beta$-unsaturated monomers of the formula:

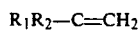

$$R_1R_2-C=CH_2$$

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of $\alpha,\beta$-unsaturated monomers are polymers including polyethylene, polypropylene, poly(1-octadecene), polyisobutylene, poly(1-pentene), poly(1-hexene), poly(5-methyl-1-hexene), poly(4-methylpentene), poly(1-butene), polybutylene, poly(methyl pentene-1), poly(3-methyl-1-butene), poly(4-methyl-1-butene), poly(4-methyl-1-pentene), poly(1-hexane), poly(5-methyl-1-hexene), poly(1-octadecene), poly(vinyl cyclopentane), poly(vinylcyclohexane), poly(a-vinylnaphthalene), and the like.

In the preferred embodiments of the invention, the fiber/film is made from a high molecular weight polyethylene polymer, a high molecular weight polypropylene polymer, a high molecular weight polyvinyl alcohol polymer, a high molecular weight polyacrylonitrile polymer or mixtures thereof.

Fibers for use in the practice of this invention are those having a tenacity of at least about 7 g/d, a tensile modulus of at least about 150 g/d and an energy-to-break of at least about 8 Joules/gram (J/g).

U.S. Pat. No. 4,457,985, hereby incorporated by reference, generally discusses high molecular weight polyethylene and polypropylene fibers. In the case of polyethylene, suitable fibers are those of molecular weight of at least about 150,000, preferably at least about 300,000, more preferably at least one million and most preferably between two million and five million. Such extended chain polyethylene (ECPE) fibers may be grown in solution as described in U.S. Pat. No. 4,137,394 or U.S. Pat. No. 4,356,138, hereby incorporated by reference, or may be a filament spun from a solution to form a gel structure, as described in German Off. 3 004 699 and GB 2 051 667, and especially described in U.S. Pat. No. 4,551,296, also hereby incorporated by reference. As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as lubricants, colorants, fillers and the like which are commonly incorporated by reference. Depending upon the formation technique, the draw ratio and temperatures, and other conditions, a variety of properties can be imparted to these filaments. The tenacity of the filaments should be at least about 8 g/d, preferably in the range of from about 8 to 45 g/d, most preferably in the range of about 25 to 35 g/d. Similarly, the tensile modulus of the filaments, as measured by an Instron tensile testing machine, is at least about 160 g/d, preferably in the range of about 160 to 3300 g/d, most preferably in the range of about 1,200 to 2,500 g/d. These highest values for tensile modulus and tenacity are generally obtainable only by employing solution grown or gel filament processes.

Similarly, highly oriented polypropylene of molecular weight at least 200,000, preferably at least one million and more preferably at least two million, may be used. Such high molecular weight polypropylene may be formed into reasonably well oriented fibers by techniques described in the various references referred to above, and especially by the technique of U.S. Pat. Nos. 4,663,101 and 4,784,820, hereby incorporated by reference, and U.S. patent application Ser. No. 069,684, filed Jul. 6, 1987 (see published application WO 89 00213). Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 g/d, preferably in the range of about 8 to 15 g/d, more preferably in the range of about 12 to 14 g/d. The tensile modulus for polypropylene is at least about 160 g/d, preferably in the range of about 160 to 300 g/d, more preferably in the range of about 250 to 280 g/d.

High molecular weight polyvinyl alcohol fibers having high tensile modulus are described in U.S. Pat. No. 4,440,711, hereby incorporated by reference. Preferred polyvinyl alcohol filaments will have a tenacity of at least about 7 g/d, preferably in the range of about 7 to 20 g/d, more preferably in the range of about 15 to 18 g/d. The tensile modulus for polyvinyl alcohol is at least about 150 g/d, preferably in the range of about 150 to 500 g/d, more preferably in the range of about 300 to 400 g/d. Suitable polyvinyl alcohol filament having a weight average molecular weight of at least about 200,000 can be produced, for example, by the process disclosed in U.S. Pat. No. 4,599,267, hereby incorporated by reference.

In the case of polyacrylonitrile (PAN), PAN fibers for use in the present invention are of molecular weight of at least about 400,000. Particularly useful PAN filament should have a tenacity of at least about 7 g/d and an energy-to-break of at least about 8 J/g. PAN filament having a molecular weight of at least about 400,000, a tenacity of at least about 15 to about 20 g/d and an energy-to-break of at least about 25 to about 30 J/g is most useful in producing ballistic resistant articles. Such fibers are disclosed, for example, in U.S. Pat. No. 4,535,027, hereby incorporated by reference.

The carrier and nitrogen-containing antioxidants are preferably combined with compatible finishes, which may be aqueous, and applied to the fiber/film in a conventional manner, e.g., with a slot applicator or kiss roll, to achieve about 0.08 to 0.12 percent add-on of the antioxidant, based on the weight of the fiber/film. The finish must be applied subsequent to solvent extraction during production of polyethylene fiber/film, preferably prior to or during drawing of the fiber/film when a process finish is typically applied. In the most preferred embodiment, the carrier preferably is the process finish lubricant, which is critical for subsequent processing during production.

The composition (carrier and antioxidant) may also be applied in tandem with the process finish application, e.g., with an applicator prior to or after the process finish applicator, to achieve about 0.08 to 0.12 percent add-on of the antioxidant, based on the weight of the fiber/film. The composition may alternatively be applied as an overfinish to the fiber/film subsequent to drawing, for example during the beaming operation, thus avoiding any processing problems. Again, the desired add-on of the antioxidant is about 0.08 to 0.12 percent based on the weight of the fiber/film. The choice of antioxidant is critical for all embodiments.

The preferred carrier is either a solvent, e.g., 1,1,1 trichloroethane, or a lubricant, preferably the process finish lubricant.

When the carrier is a lubricant, it is the reaction product of an alkylene oxide with a fatty acid or an alcohol having about 5 to 36 carbon atoms, more preferably about 5 to 18 carbon atoms, most preferably about 6 to 12 carbon atoms. The fatty acid/alcohol may be saturated or unsaturated, straight chain or branched chain, as would be obvious to one having ordinary skill in the art. The alkylene oxide preferably is either propylene oxide or ethylene oxide, most preferably the latter. The number of moles of alkylene oxide per mole of compound is from about 2 to 20, more preferably about 4 to 12, most preferably about 9.

The polyoxyalkylene, preferably polyoxyethylene, chain of the lubricant carrier has a molecular weight in the range of from about 100 to 1,000, preferably about 200 to 600, most preferably about 400. The preferred lubricant carrier is selected from the group consisting of polyalkylene glycol (400) pelargonate, polyalkylene glycol (200) monolaurate, polyalkylene glycol (600) monoisostearate, and combinations thereof with or without other lubricants. The numbers in parentheses indicate the molecular weight of the polyoxyalkylene chain.

The preferred nitrogen-containing antioxidant is selected from the group consisting of bis(1,2,2,6,6-pentamethyl-4-piperidinyl)sebacate; bis(2,2,6,6-tetramethyl-4-piperidinyl)sebacate; 2-(3',5'-di-tert-butyl-2'-hydroxyphenyl)-5-chlorobenzotriazole; 4,4'-bis($\alpha,\alpha$-dimethylbenzyl)-diphenylamine; the low temperature reaction product of diphenylamine and acetone with a melting point of 85° C. to 95° C.; 4-((4,6-bis(octylthio)-s-triazin-2-yl)amino)-2,6-di-tert-butylphenol; aziridine and its derivatives, such as 1 aziridinepropanic acid,2-[[3-(1-aziridinyl)-1-oxopropoxy]methyl]-2-ethyl-1,3-propanediyl ester; amine oxide; and combinations thereof. The Tinuvin series of hindered amines is especially preferred; structurally similar multifunctional hindered amine compounds are contemplated to be within the scope of the invention.

With respect to proportions of the lubricant and the nitrogen-containing antioxidant in the finish composition, it is sufficient to include an effective amount of each component to obtain enhanced breaking strength retention over a control. For the antioxidant, the preferred on fiber/film level ranges from at least about 0.08%, more preferably about 0.08 to 0.12%, most preferably about 0.1%, based on the weight of the fiber/film.

In the examples which follow, the finish compositions were prepared as follows: Any wetting agents or additives were blended with the lubricant(s) first at room temperature. The antioxidant was then added to the lubricant system and the resulting mixture was heated at 60° C. until the antioxidant dissolved in the system. This finish composition was then allowed to cool to room temperature (about 25° C.) for application. A lube roll was used to apply the finish composition at an add-on target of 1% on the weight of the fiber. Although the examples are limited to extended chain polyethylene fiber, it is believed that similar results would be obtained with film and the other polymers previously set forth.

A complete set of fiber physicals, i.e., denier, tenacity and modulus, were recorded for each fiber sample produced. A nine meter skein from each sample was attached to a rod and placed, without touching, in an oven at 110°±1° C. The skein samples were removed after 144 hours (6 days) and a complete set of fiber physicals recorded. Breaking strength retention (%) was determined based on an average of ten individual breaks per sample. Testing was in accordance with ASTM D-2256 Option 1A.

EXAMPLES 1-20

In this series of examples, SPECTRA ® 900 fiber (1200 denier, 120 filaments, 28 g/d tenacity, and 1200 g/d modulus) was produced substantially in accordance with the teachings of U.S. Pat. No. 4,413,110, but without heating tubes 57 and 64, and in a continuous (coupled) process with a plurality of heated draw rolls forming a heated draw zone to achieve the yarn physicals. The finish was applied during drawing of the fibers between a set of draw rolls, and as such, was deemed to be a process finish. Example 1 is a first control yarn without any finish, Examples 2-5 are control yarns with a finish containing no antioxidant, and Examples 6-17 are yarns of the present invention wherein the lubricant and antioxidant are as set forth in Table 4 (and detailed in Tables 1-3). Breaking strength retentions are presented in Table 4. With reference to Examples 1-5, it can be seen that use of a finish composition (without any antioxidant) surprisingly had an adverse affect on the breaking strength retention of the fiber. Example 7 demonstrates the improvement to be obtained with incorporation of an acceptable antioxidant—the lubricant used was the same as that of Example 2 (different manufacturer), and substantially improved the breaking strength retention compared to Example 2 at a very low level of antioxidant. Increased level of antioxidant in a nonaqueous system (Example 8) enhanced the breaking strength retention even more.

The breaking strength retentions of Examples 12 and 17 were very good as compared with the control yarns; however the mechanical quality of the yarn was poor due to the poor lubricating properties of the lubricant in production. Similarly, the mechanical quality of the yarn was poor for Example 9.

Examples 18-20 are comparative yarns which had poor breaking strength retentions due to the antioxidant used, i.e., hindered phenols; this was surprising since these hindered phenols have been used as stabilizers for polyolefins.

With reference to Table 1, it can be seen that both the lubricant and antioxidant when used together in the process finish are critical—the lubricant affects the subsequent processing of the fiber, and the antioxidant affects the breaking strength retention of the fiber.

EXAMPLES 21-35

Example 2 is repeated with the finish compositions set forth in Table 4 for Examples 6-20 being applied as overfinishes (subsequent to drawing of the fiber) in Examples 21-35, respectively. It is believed that breaking strength retentions similar to those for Examples 6-20 would be obtained in Examples 21-35, respectively. The choice of lubricant is no longer critical—in fact any lubricant compatible with the antioxidant chosen can be used. The antioxidant, however, will still be critical to the breaking strength retention of the fiber.

TABLE 1

| # | TRADE NAME | LUBRICANTS MANUFACTURER | DESCRIPTION |
|---|---|---|---|
| 1 | Glytex 1240 | Lonza Chemical | PEG[1] (400) monopelargonate |
| 2 | Ethox 1122 | Ethox Chemical | PEG[1] (400) pelargonate |
| 3 | Ucon 50 HB 100 | Union Carbide | EO/PO[2] random copolymer |
| 4 | Ethox HCO 25 | Ethox Chemical | POE[3] (25) hydrogenated castor oil |
| 5 | Ethox MI-9 | Ethox Chemical | PEG[1] (400) monoisostearate |
| 6 | Ethox CO-200 | Ethox Chemical | POE[3] (200) castor oil |
| 7 | Goulston Lubricant | Geo. A. Goulston | PEG[1] (400) capped pelargonate |
| 8 | Ethox CO-16 | Ethox Chemical | POE[3] (16) castor oil |
| 9 | Kessco | Kessco Chemical | PEG[1] (400) pelargonate |
| 10 | Leoman AN | Hoechst-Celanese | Oleyl phosphonate |
| 11 | POE (16) HCO | Ethox Chemical | POE[3] (16) hydrogenated castor oil |

[1] Polyethylene glycol.
[2] Ethylene oxide/propylene oxide.
[3] Polyoxyethylene. Number in parenthesis represents moles of ethylene oxide per mole of castor oil.

TABLE 2

| # | TRADE NAME | ANTIOXIDANTS MANUFACTURER | DESCRIPTION |
|---|---|---|---|
| 1 | Tinuvin 765 | Ciba Geigy Corp. | bis(1,2,2,6,6-pentamethyl-4-piperidinyl) sebacate |
| 2 | Tinuvin 770 | Ciba Geigy Corp. | bis(2,2,6,6-tetramethyl-4- |

TABLE 2-continued

ANTIOXIDANTS

| # | TRADE NAME | MANUFACTURER | DESCRIPTION |
|---|---|---|---|
| 3 | Tinuvin 327 | Ciba Geigy Corp. | piperidinyl) sebacate 2-(3',5'-di-tert-butyl-2'-hydroxyphenyl)-5-chlorobenzotriazole |
| 4 | Naugard 445 | Uniroyal Chem. | 4,4'-bis(α,α-dimethylbenzyl) diphenylamine |
| 5 | Aminox | Uniroyal Chem. | Low temperature reaction product of diphenylamine and acetone with m.p. of 85–95° C. |
| 6 | Irganox 565 | Ciba Geigy Corp. | 4-[(4,6-bis(octylthio)-s-triazin-2 yl)amino]-2,6-di-tert-butylphenol |
| 7 | Xama-2 | Cordova Chem. | 1 aziridinepropanic acid, 2-[[3-(1-aziridinyl)-1-oxopropoxy]methyl] 2-ethyl-1,3-propanediyl ester |
| 8 | Stantex 4413 | Henkel-Emery | Amine oxide |
| 9 | Santonox R | Monsanto Chem. | 4,4'thiobis(6-tert-butyl-m-cresol) |
| 10 | Irganox 1010 | Ciba Geigy Corp. | tetrakis[methylene 3-(3',5'-di-tert butyl-4'-hydroxyphenyl)proprionate] methane |
| 11 | Ionol | Ciba Geigy Corp. | 2,6 ditertiary butyl-p-cresol (hindered phenol type) |

TABLE 3

OTHER FINISH INGREDIENTS

| # | DESCRIPTION |
|---|---|
| 1 | Wetting agent, 0.01% on weight of composition |
| 2 | POE (5) $C_{13}$ alcohol phosphate |
| 3 | POE (10) nonyl phenol |

TABLE 4

FINISH COMPOSITIONS AND BREAKING STRENGTH RETENTIONS

| EXAMPLE | LUBRICANT SYSTEM # (PARTS) | ANTIOXIDANT # (PARTS) | WATER * | OTHER # (PARTS) | B.S. RET. (%) |
|---|---|---|---|---|---|
| 1 (control) | — | — | 99.99 | 1 | 56 |
| 2 (control) | 1 (100) | — | 400 | — | 28 |
| 3 (control) | 2 (25) 5 (30) 6 (20) | — | 400 | 1 2 (25) | 20 |
| 4 (control) | 3 (20) | — | 80 | 1 | 20 |
| 5 (control) | 7 (89) 8 (10) | — | 400 | 3 (1) | 18 |
| 6 | 9 (80) | 1 (20) | 400 | 1 | 85 |
| 7 | 2 (98) | 2 (2) | 400 | — | 54 |
| 8 | 2 (90) | 2 (10) | — | — | 95 |
| 9 | 4 (98) | 3 (2) | 400 | — | 43 |
| 10 | 2 (25) 5 (30) 6 (20) | 1 (24) | 400 | 1 2 (25) | 96 |
| 11 | 1 (40) 4 (40) | 1 (20) | 400 | 1 | 84 |
| 12 | 10 (40) 4 (40) | 1 (20) | 400 | — | 95 |
| 13 | 2 (90) | 4 (10) | — | — | 93 |
| 14 | 2 (90) | 5 (10) | — | — | 94 |
| 15 | 2 (90) | 6 (10) | — | 1 | 95 |
| 16 | 2 (10) | 8 (50) | 40 | — | 88 |
| 17 | 3 (90) | 7 (10) | — | 1 | 100 |
| 18 | 2 (45) 3 (50) | 10 (5) | 400 | 1 | 20 |
| 19 Comparative | 2 (95) | 11 (5) | 400 | 1 | 18 |
| 20 Comparative | 1 (60) 11 (22) | 9 (3) | 400 | 1 2 (15) | 38 |

*Parts, except for Example 1, which is percent.

We claim:

1. A method of producing a stabilized article made from a polyethylene having a weight average molecular weight of at least 150,000, wherein said polyethylene is dissolved in solution prior to formation of said articles and then subjected to solvent extraction, the method comprising, subsequent to said solvent extraction, applying to the article an amount effective to improve breaking strength of said article of a composition comprising a nitrogen-containing antioxidant and a compatible carrier for said antioxidant, said antioxidant being selected from the group consisting of hindered amines and benzotriazoles and said carrier comprising a lubricant which is the reaction product of an alkylene oxide with a compound selected from the group consisting of a fatty acid having about 5 to 36 carbon atoms and an alcohol having about 5 to 36 carbon atoms, the number of moles of said alkylene oxide per mole of said compound being from about 2 to 20.

2. The method of claim 1 wherein said article is a film.

3. The method of claim 1 wherein said article is a fiber.

4. The method of claim 1 wherein said antioxidant is selected from the group consisting of bis(1,2,2,6,6-pentamethyl-4-piperidinyl)sebacate; bis(2,2,6,6-tetramethyl-4-piperidinyl)sebacate; 2-(3′,5′-di-tert-butyl-2′-hydroxyphenyl)-5-chlorobenzotriazole; 4,4′-bis(α,α-dimethylbenzyl)-diphenylamine; the low temperature reaction product of diphenylamine and acetone with a melting point of 85° C. to 95° C.; 4-((4,6-bis(octylthio)-s-triazin-2-yl)amino)-2,6-di-tert-butylphenol; aziridines; amine oxide; and combinations thereof.

5. The method of claim 1 wherein the amount of said antioxidant on the article is at least about 0.08% based on the weight of the article.

6. The method of claim 1 wherein said antioxidant is selected from the group consisting of bis(1,2,2,6,6-pentamethyl-4-piperidinyl)sebacate; bis(2,2,6,6-tetramethyl-4-piperidinyl)sebacate; 2-(3′,5′-di-tert-butyl-2′-hydroxyphenyl)-5-chlorobenzotriazole; and combinations thereof.

7. The method of claim 6 wherein the article is a fiber.

8. The fiber made in accordance with claim 7.

9. The article made in accordance with claim 1.

10. The method of claim 1 wherein said fatty acid has about 5 to 18 carbon atoms and said alcohol has about 5 to 18 carbon atoms.

11. The method of claim 10 wherein said lubricant is selected from the group consisting of polyalkylene glycol (400) pelargonate, polyalkylene glycol (200) monolaurate, polyalkylene glycol (600) monoisostearate, and combinations thereof.

12. The method of claim 10 wherein said lubricant is polyalkylene glycol (400) pelargonate.

13. The method of claim 11 wherein said antioxidant is selected from the group consisting of bis(1,2,2,6,6-pentamethyl-4-piperidinyl)sebacate; bis(2,2,6,6-tetramethyl-4-piperidinyl)sebacate; 2-(3′,5′-di-tert-butyl-2′-hydroxyphenyl)-5-chlorobenzotriazole; and combinations thereof.

14. The method of claim 13 wherein the article is a fiber.

15. The fiber made in accordance with claim 14.

16. A polyethylene fiber having a weight average molecular weight of at least 150,000 which has been dissolved in solution and then subjected to solvent extraction and is stabilized with a nitrogen-containing antioxidant selected from the group consisting of hindered amines and benzotriazoles which have been applied to said fiber subsequent to said solvent extraction by application of said antioxidant in a compatible carrier to said fiber, said carrier comprising a lubricant which is the reaction product of an alkylene oxide with a compound selected from the group consisting of a fatty acid having about 5 to 36 carbon atoms and an alcohol having about 5 to 36 carbon atoms, the number of moles of said alkylene oxide per mole of said compound being from about 2 to 20.

17. The method of claim 1 wherein the polyethylene has a molecular weight of at least 1,000,000.

18. The method of claim 1 wherein the molecular weight is weight average molecular weight.

19. The method of claim 17 wherein the molecular weight is weight average molecular weight.

20. The fiber of claim 16 wherein the molecular weight is weight average molecular weight.

* * * * *